(12) United States Patent
Potts

(10) Patent No.: US 7,699,519 B2
(45) Date of Patent: Apr. 20, 2010

(54) ALCOHOL-SOLVENT EXTRACTION SYSTEM

(75) Inventor: Mark H. Potts, Williamsfield, IL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 597 days.

(21) Appl. No.: 11/526,891

(22) Filed: Sep. 11, 2006

(65) Prior Publication Data

US 2007/0056839 A1    Mar. 15, 2007

Related U.S. Application Data

(60) Provisional application No. 60/715,578, filed on Sep. 12, 2005.

(51) Int. Cl.
*B01F 7/00*    (2006.01)
*B01D 17/035*    (2006.01)
*C02F 1/26*    (2006.01)

(52) U.S. Cl. .................. 366/296; 210/702; 210/634

(58) Field of Classification Search .................. 366/296
See application file for complete search history.

(56) References Cited

U.S. PATENT DOCUMENTS

| | | | | |
|---|---|---|---|---|
| 634,093 A | * | 10/1899 | Rosenblum et al. | 422/225 |
| 899,841 A | * | 9/1908 | Rothgeber | 366/296 |
| 1,386,410 A | * | 8/1921 | Klots | 422/186 |
| 2,182,826 A | * | 12/1939 | Sheffield | 568/666 |
| 2,211,432 A | * | 8/1940 | Palmer et al. | 585/432 |
| 2,838,575 A | * | 6/1958 | Smith | 568/860 |
| 3,014,047 A | * | 12/1961 | Bain et al. | 549/512 |
| 4,906,101 A | * | 3/1990 | Lin et al. | 356/442 |
| 5,454,878 A | * | 10/1995 | Bala et al. | 134/10 |

OTHER PUBLICATIONS

Ullmann Encyclopedia of Industrial Chemistry—Xylenes, wiley-Vch Verlag GmbH & Co. KGaA, 2002.*
H.G. Fisher et al., Emergency Relief System Design Using DIERS Technology, pub. By AIChE, New York, 1992.*

* cited by examiner

*Primary Examiner*—Walter D Griffin
*Assistant Examiner*—Denise R Anderson
(74) *Attorney, Agent, or Firm*—Joseph K. Hemby, Sr.; Albert M. Churilla; Ning Yang

(57) ABSTRACT

The invention relates to a method and apparatus to carry out the method for extracting petroleum distillate products from alcohol. The inventive method capitalizes on the discovered property that petroleum distillates, such as xylene and limonene, can be dissociated from their tight molecular interaction with alcohol by their higher affinity for water. The method also capitalizes on the discovered property that limonene, in the presence of water, forms terpin hydrate, forming particles that can be removed by filtration. Other, non-limonene petroleum distillates, once dissociated from alcohol, can be removed by distillation.

13 Claims, 4 Drawing Sheets

ALCOHOL-SOLVENT EXTRACTION SYSTEM

CROSS-REFERENCE TO RELATED APPLICATIONS

This application claims priority to U.S. Provisional Application 60/715,578 filed Sep. 12, 2005.

BACKGROUND OF INVENTION

1. Field of Invention

The inventive subject matter relates to an improved method and apparatus for recycling alcohol contaminated with petroleum distillates, including clearing agents, typically encountered in histocytology laboratories, such as xylene and limonene. The method and apparatus leads to recovery of alcohol and clearing agents as well as a reduction of hazardous waste.

2. Description of the Related Art

A natural byproduct of laboratories is the generation of hazardous waste creating a significant added operational cost to the facility. For example, chlorinated solvents are a major contributor to ozone depletion. The Clean Air Act Amendments of 1990 mandated a reduction in the amounts of solvents released into the atmosphere. Because of this mandate, industrial and laboratory costs have been risen significantly.

Although disposal methods, such as incineration, are available, recycling of reagents is preferred since generated waste products are returned to further use and the total volume of hazardous waste that needs to be disposed by other means is reduced. Since alcohol is an important ingredient in a large number of processes. Therefore, either rendering alcohol free of hazardous pollutants for eventual disposal or recycling the alcohol volumes is of critical importance.

Recycling of solvents is widely used in industry as well as in some industrial and academic laboratory settings. Recycling of solvents can be divided into three primary distillation methodologies. The first utilizes a simple distillation unit, which heats the solvent waste to drive off the solvent as a vapor. The remaining waste at the bottom of the still is collected and disposed. The second type of distillation method requires versions of fractional stills, which produces a higher purity of recycled product than that produced using the distillation method. A disadvantage of fractional stills, however, is the relatively high cost involved in their operation, compared to other methods. The third distillation method utilizes thin film evaporation. In this method the solvent is distilled by running a thin film down a heated cylindrical vessel where it is eventually vaporized. Thin film evaporators are typically utilized in high volume processes that are operated on a continuous basis.

Separation of solvents from a liquid mixture is widely conducted in laboratories and industry by distillation. Efficiency of separation is, to a great extent, dependent on the molecular properties of the solvent mixture and the differences in boiling points of the solvents. Simplified distillations have been disclosed. For example U.S. Pat. No. 6,638,397 issued October 2003 to Camiener, et al teaches a simplified distillation process for recovery of solvents that have similar boiling points. Additionally, U.S. Pat. No. 6,497,813 issued December 2002 to Ackerson, et al teaches a method of purifying petroleum products to remove oils and aromatics using phase equilibria.

A common aspect of these systems is that they are effective at recycling alcohol that has not been contaminated by commonly used petroleum distillates, such as xylene and limonene. Currently available systems are capable of retrieving the volume of alcohol not contaminated with these chemicals but leaves a significant volume of alcohol, up to 50%, that is not economically recoverable and, therefore, must be disposed.

Petroleum distillation products, such as xylene and limonene are routinely used as clearing agents in biology laboratories, such as histology facilities or industrial concerns. A need exists for the removal of these products from alcohol with the intention of either recovering the petroleum distillation products or reducing the concentration in the alcohol volumes to permit easier and cheaper disposition of hazardous waste.

SUMMARY OF INVENTION

An aspect of the current invention is a method of extracting petroleum distillation products from alcohol, which is then able to be returned for use or inexpensively disposed as non-hazardous waste. Additionally, the petroleum products are either recycled or disposed.

An aspect of the inventive method is the extraction of petroleum distillation products based on their inability to have higher miscible in water than in alcohol. The method entails a multi-phase process of first separating the petroleum products that are not tightly interacting with alcohol by the addition of water. The free petroleum products dissolved in the water form a separate phase from the alcohol that can be drawn off. The second phase is the removal of petroleum products that are tightly interacting with alcohol by forming either a precipitate or by evaporating it from the alcohol.

An additional aspect of the invention is the extraction of limonene by forming terpin hydrate through the exposure of contaminating limonene in alcohol with added water along with vigorous agitation. The aspect further contemplates the formation of terpin hydrate particles that are subsequently filtered out of the contaminated alcohol.

A further aspect of the invention is an apparatus for extracting petroleum distillate products from alcohol for either recovery or non-hazardous disposal of the alcohol or petroleum products.

DETAILED DESCRIPTION OF THE PREFERRED EMBODIMENTS

Current solvent recycling methods can only recycle alcohol that has not contain petroleum distillation contaminates such as xylene or limonene. These chemicals are routinely utilized in biology facilities such as histology laboratories. Contaminate, therefore, is defined as a petroleum distillate, such as xylene or limonene. Of importance is that these reagents are often highly miscible with alcohol. Upon distillation, the reagents simply carry over with the alcohol molecules thus rendering distillation an ineffective method for recycling alcohol. As such, alcohol containing these reagents are often disposed as hazardous material, at significant financial cost.

The current invention takes advantage of the high affinity of these contaminate moieties for water, compared to their affinity for alcohol molecules. The general concept utilizes an aqueous phase reactor incorporating air and high-speed stirring, in the presence of water, to shear ethanol-contaminate interactions and permit extraction of the contaminate out of the alcohol.

The method is a two-phase system. In the first phase, contaminate molecules that are only loosely interacting with alcohol are extracted from the alcohol volume by the addition of water, under high-speed stirring. These contaminate molecules have a higher affinity for the water than the alcohol and are removed from the alcohol volume by removing the aqueaous phase. The contaminate/water phase can then be either disposed of has hazardous waste or the contaminate further extracted by processes such as distillation, since the contaminate molecule is now free of alcohol.

In the second phase, extraction of contaminate molecules that are more tightly interacting with alcohol occurs. In this phase, the remaining contaminated alcohol is exposed to a high-speed stirrer creating a vigorous vortex action with the additional infusion of a large amount of air. These shearing actions remove the tight alcohol-contaminate interaction permitting the remaining contaminate molecules to be removed by distillation. Furthermore, in the case of limonene, a chemical reaction occurs resulting in the formation of terpin hydrate particles, which can be removed by filtration. During the first and second phases, the clarity of the solution is monitored, going from highly turbid to clear. In a typical operation, the alcohol concentration of the solution, after the addition of distilled water, is about 50% (v/v). After the process, the 50% alcohol solution can be subjected to distillation in order to further reclaim the alcohol.

EXAMPLE

Method of Extraction of Limonene and Apparatus for Extraction

In order to better illustrate the invention, an example of the extraction of limonene is described. Additionally, an apparatus for the carrying out the method of removal of limonene is also disclosed, however the apparatus is generally applicable to the extraction of other petroleum distillate contaminates, including xylene.

Figure 1:
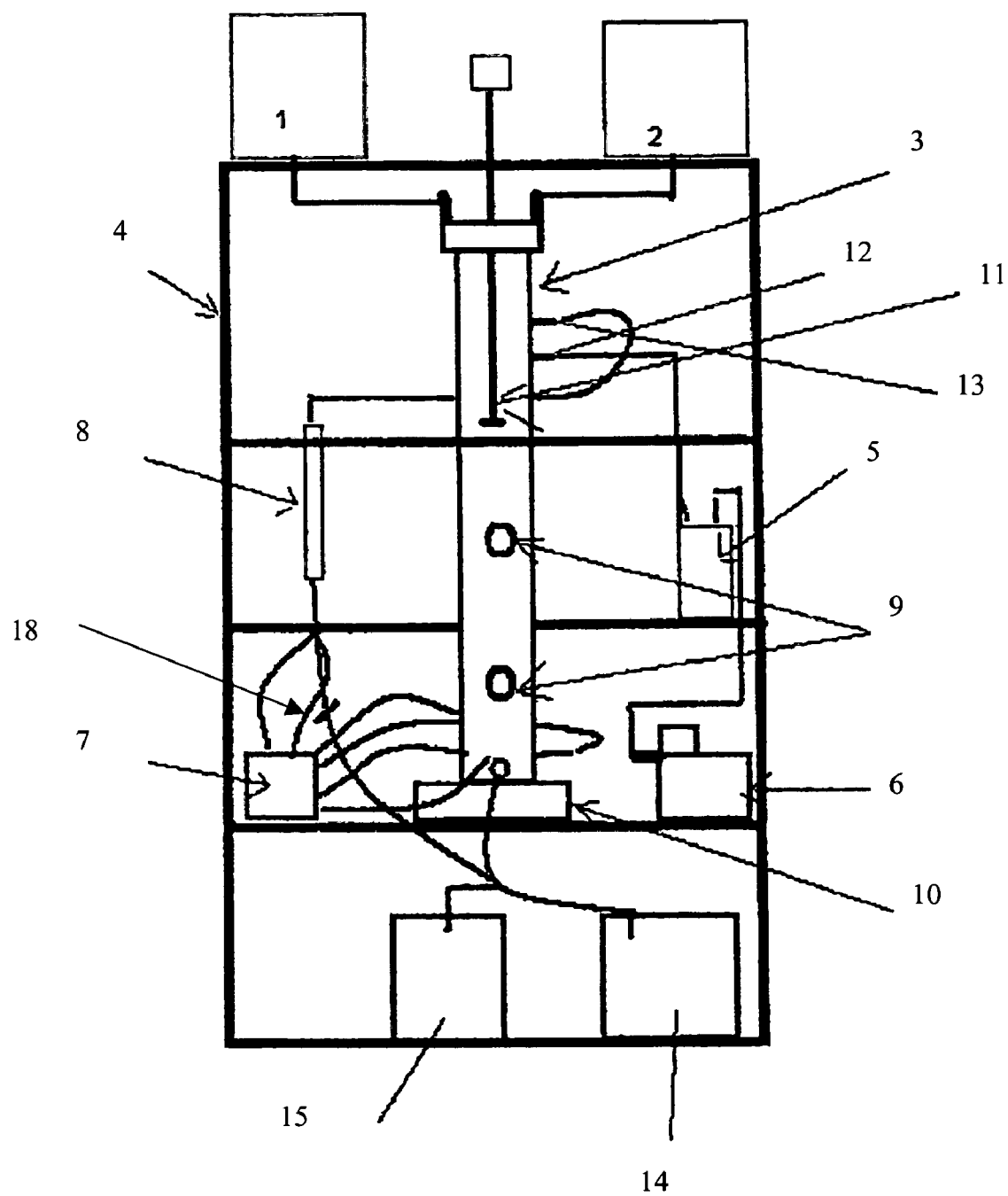
FIG. 1. Illustration of apparatus.

Referring to FIG. 1, the apparatus is comprised of a reaction core (3). In a preferred embodiment, the reaction core is 36 inches in length and has an outer diameter of 100 mm. However, the invention contemplates devices encompassing other dimensions, as well. Connected to the core (3) are two storage tanks, one of which stores distilled water (1) and the other for storing contaminated alcohol (2). In this example, the contaminated alcohol contains limonene as contaminate.

The method is operationally carried out in two phases. In phase I, the process is initiated by adding a volume of distilled water to the reaction core while a bottom stirring device (10), such as a heavy duty magnetic stirrer, is vigorously stirring. After the addition of distilled water to the reaction core, an equal volume of contaminated alcohol is added. After adding the contaminated alcohol, the vortex action from the high-speed impeller (11), which creates a vortex of opposite direction to that produced by the bottom stirring device (10), ensures that the distilled water and contaminated alcohol are well mixed making the overall appearance of the solution turbid. At this point, limonene that is not tightly interacting with alcohol molecules is displaced and begins to rise to the surface of the reaction core. After approximately one hour, the vacuum pump (6) is started and provides negative pressure to the extraction port valve (16), which is opened drawing the water-contaminate solution at the top of the reaction core into the collection tank (5). Additional distilled water is run into the core to remove any remaining limonene on the surface, after which the extraction port is closed and the pump shut off. The limonene can either be disposed of or recycled.

Figure 2:
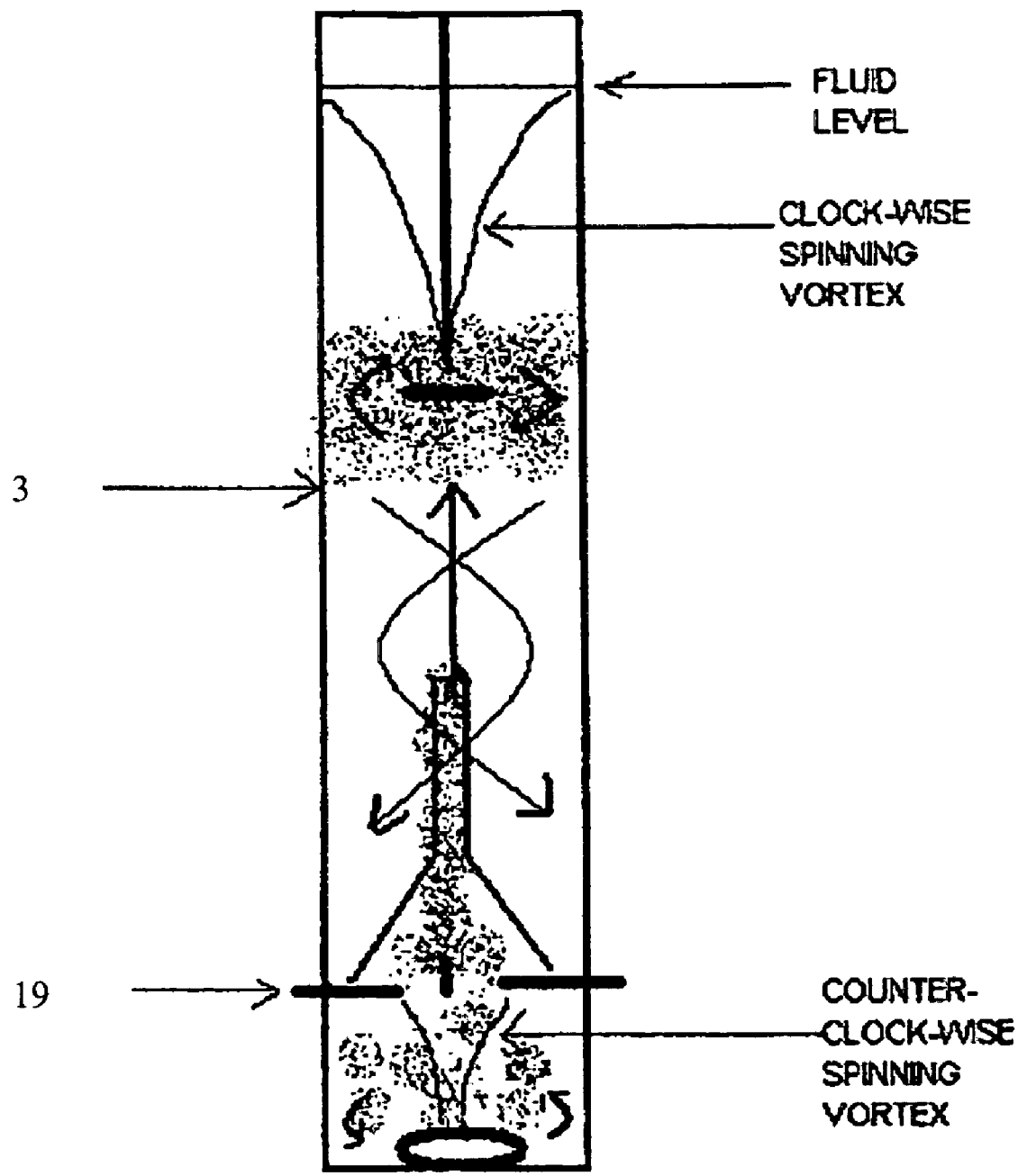
FIG. 2. Schematic illustration of clock-wise and counter-clockwise vortex action and air infusion.

In phase II, the limonene molecules that are more tightly interacting with alcohol are removed by first disrupting the molecular interactions. This process is initiated by turning on the high-speed impeller (11) to about 3,000 rpm creating a large clock-wise spinning vortex. The pneumatic system (7) is then turned on, which infuses a large volume of air through four infusion ports (19) located near the base of the core. Referring to FIG. 2, the air and fluid is drawn down into the bottom stirring device creating a vortex motion opposite the high speed impeller. Just above the bottom stirring device is a shear accelerator (17), which is an inverted funnel containing a long narrow neck. The shear accelerator captures large amounts of air and fluid and compresses them together as the mixture races through the stem and up towards the high-speed impeller.

Figure 3:
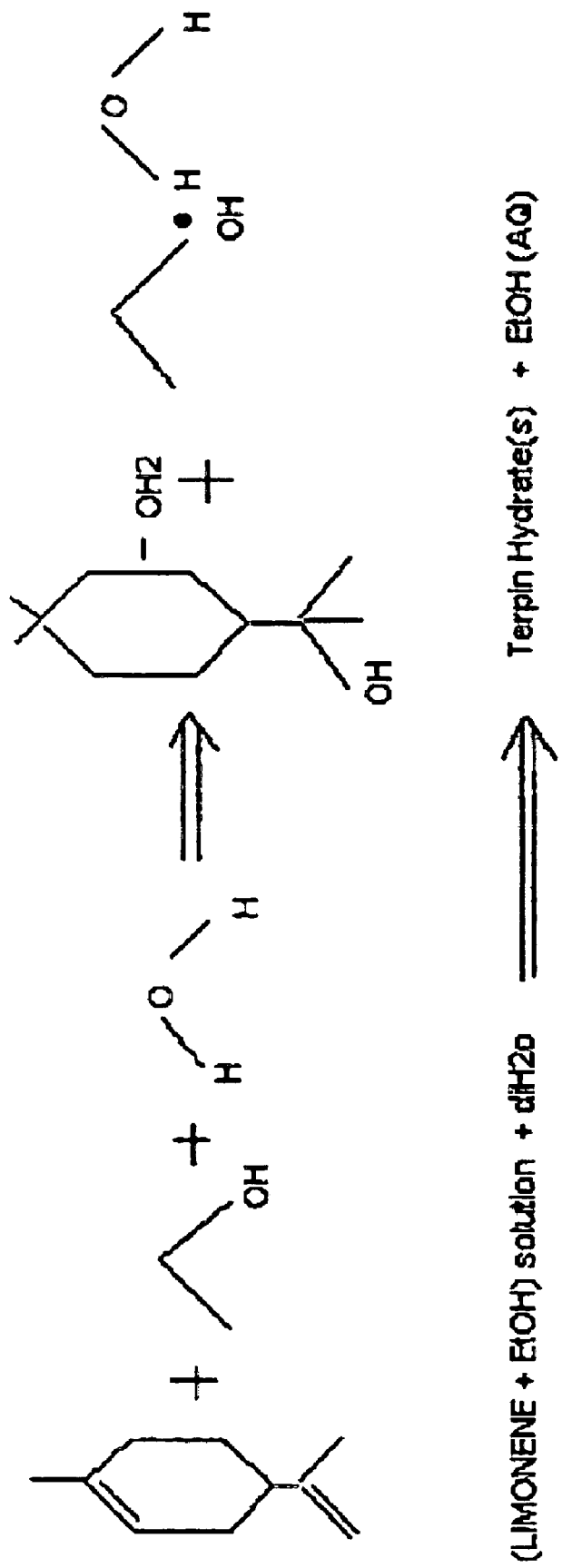
FIG. 3. Chemical equation illustrating formation of terpin hydrate from limonene.

During the process, limonene undergoes a chemical and physical change. Referring to FIG. 3, the limonene molecules lose one of its hydrogen atoms converting the molecule to terpin hydrate. Terpin hydrate, a solid, become free-floating microparticles, which collide with and adhere to other terpin hydrate microparticles until they are eventually able to be seen with the naked eye.

After approximately one hour, the terpin hydrate particles are filtered out in the particle filter (8), illustrated in FIG. 1. The fluid is released by opening the filter inlet port valve (18) near the base of the core. The core's own fluid pressure forces the fluid into the filter where it is mixed with more air ultimately leading to trapping of terpin hydrate particles in the filtration matrix. The fluid exits the filter and is forced back into the main core through the post-filter inlet port valve (13). The fluid continues to circulate through the filter for approximately two hours.

Figure 4:
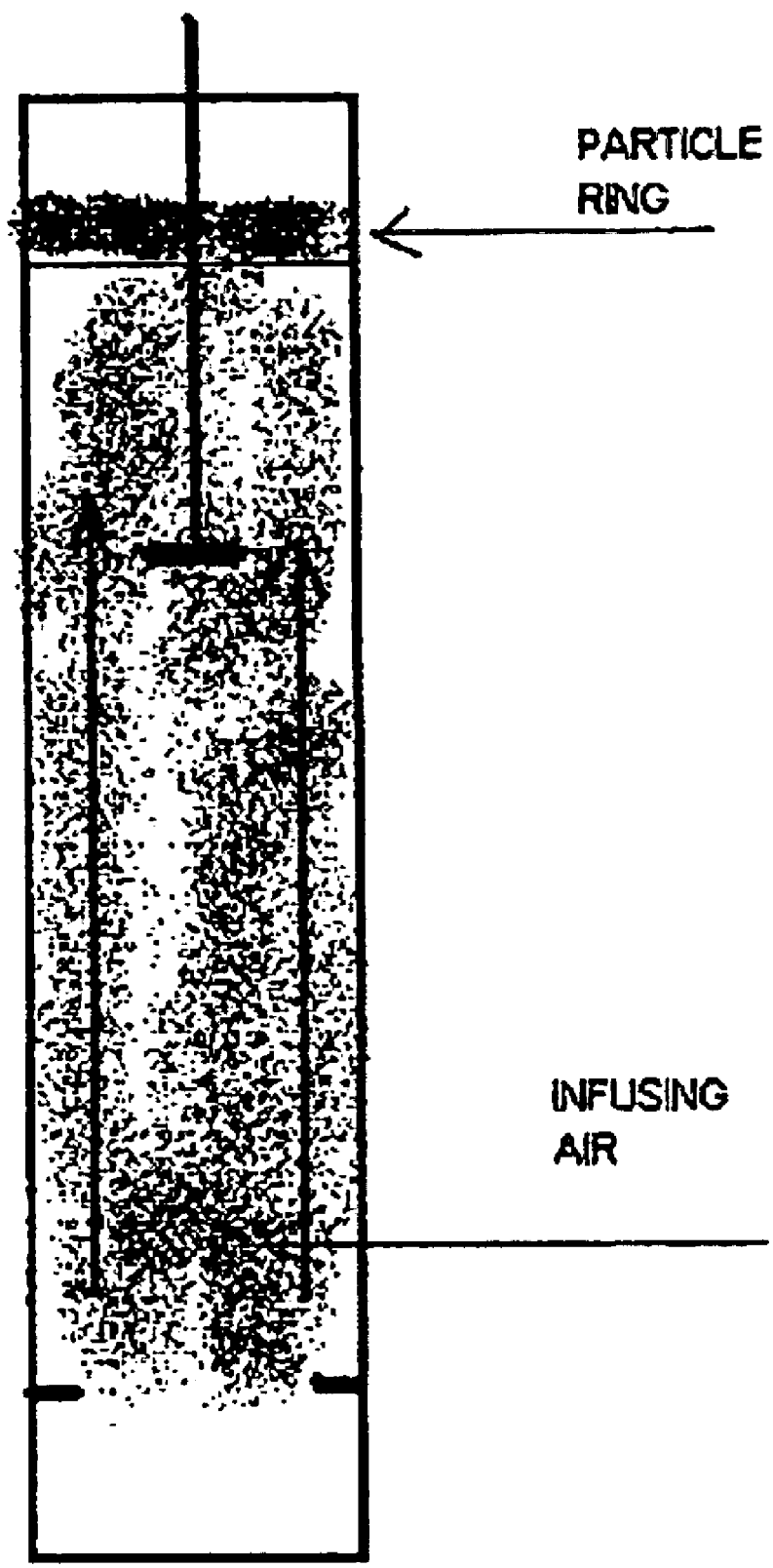
FIG. 4. Illustration of formation of particle ring.

After two hours the fluid is relatively clear with no turbidity indicating the process has been completed. Clarity of the solution is monitored by illuminating the core with small lamps (9) to help judge the clarity. After the process is determined to be complete, the high-speed impeller is shut off allowing the infused air entering at the bottom of the core to bring any unfiltered limonene particles to the surface where they form a ring around the inside of the reaction core. The ring appearance is illustrated in FIG. 4. The solution is then drained out of the core into a storage tank (14). In a preferred embodiment, the apparatus has an emergency release storage tank (15) used to store alcohol that has not finished the decontamination process.

After completion of the process, the alcohol is free of limonene. The alcohol concentration of the solution, after the addition of the distilled water, is 50% (v/v). The 50% alcohol solution can then be run through a distillation system in order to further reclaim the alcohol. The apparatus can reclaim and distill approximately 95% of the original amount of alcohol that was decontaminated. The waste generated from the apparatus consists of mostly water with an alcohol concentration of approximately 10%, which can typically be readily discarded.

Although the example discloses the extraction of limonene, other petroleum distilled clearing agents, such as xylene, can also be extracted using the same procedure. However, unlike limonene, xylene does not undergo the same chemical transformation as limonene nor does it form particles. Instead, subsequent to the above disclosed process, the xylene is evaporated from the alcohol. Extraction of xylene by this method produces similar results as with limonene.

Having described the invention, one of skill in the art will appreciate in the appended claims that many modifications and variations of the present invention are possible in light of the above teachings. It is therefore, to be understood that, within the scope of the appended claims, the invention may be practiced otherwise than as specifically described.

I claim:

1. An apparatus for extracting petroleum distillate products from alcohol consisting of a reaction core having a base, a bottom portion and a top portion, where the top portion comprises the top 50% of the reaction core and the bottom portion comprises the bottom 50% of the reaction core, with the reaction core further having an impeller connected to an impeller shaft that is operably connected to a high speed motor with the impeller shaft extending up to the length of said reaction core top portion, a bottom stirring device located on said base of said reaction core that creates a vortex of opposite direction that that created by said high speed motor and impeller, a collection tank operably connected to said top portion of said reaction core and a vacuum pump that is operably connect to said collection tank such that vacuum supplied by said vacuum pump results in fluid from the reaction core being drawn into and deposited into said collection tank, an air infusion port in said bottom portion of said reaction core that is operably connected to a pneumatic pump, a shear accelerator in said bottom portion of said reaction core, comprising an inverted funnel with a narrow neck so that air supplied by said pneumatic pump via said air infusion port is supplied to the wide opening of the funnel and up to the top portion of the reaction core via said narrow neck of said shear accelerator and a drain at the base of said reaction core operably connected to a storage tank.

2. The apparatus of claim 1 further comprising two storage tanks, each operably connected to said reaction core via a tube wherein one storage tank is for storage of contaminated alcohol and the other storage tank is for storage of distilled water.

3. The apparatus of claim 1 further comprising an emergency release storage tank operably connected to said reaction core via a tube.

4. The apparatus of claim 1, also comprising a filter containing top and bottom portions, wherein said bottom portion of said reaction core is operably connected to said bottom portion of said filter via a tube and by another tube from said top portion said filter to the said top portion of said reaction core so that fluid can pass out of the base of the reaction core into the filter and back into the reaction core.

5. The apparatus of claim 1, wherein the reaction core also contains halogen lamps.

6. A method of extracting petroleum distillate contaminate from alcohol using an apparatus, wherein said apparatus consisting of a reaction core having a base, a bottom portion and a top portion, where the top portion comprises the top 50% of the reaction core and the bottom portion comprises the bottom 50% of the reaction core, with the reaction core further having an impeller connected to an impeller shaft that is operably connected to a high speed motor with the impeller shaft extending up to the length of said reaction core top portion, a bottom stirring device located on said base of said reaction core that creates a vortex of opposite direction that that created by said high speed motor and impeller, a collection tank operably connected to said top portion of said reaction core and a vacuum pump that is operably connect to said collection tank such that vacuum supplied by said vacuum pump results in fluid from the reaction core being drawn into and deposited into said collection tank, an air infusion port in said bottom portion of said reaction core that is operably connected to a pneumatic pump, a shear accelerator in said bottom portion of said reaction core, comprising an inverted funnel with a narrow neck so that air supplied by said pneumatic pump via said air infusion port is supplied to the wide opening of the funnel and up to the top portion of the reaction core via said narrow neck of said shear accelerator, a drain at the base of said reaction core operably connected to a storage tank, and a filter containing top and bottom portions, wherein said bottom portion of said reaction core is operably connected to said bottom portion of said filter via a tube and by another tube from said top portion said filter to the said top portion of said reaction core so that fluid can pass out of the base of the reaction core into the filter and back into the reaction core; comprising:
   a. adding equal quantities of contaminated alcohol and distilled water to said reaction core;
   b. allowing a first phase, containing a contaminate in water and a second phase containing a contaminate in alcohol, to form in a vessel;
   c. exposing liquid to vigorous stirring by said impeller and said bottom stirring device;
   d. removing said first phase into said collection tank;
   e. exposing the said second phase to further vigorous stirring by said impeller and said bottom stirring device and to air supplied by said pneumatic pump via said shear accelerator;
   f. removing said contaminates from said second phase by either passing second phase into said filter to remove particles or by distillation or both filtering and distillation.

7. The method of claim 6, wherein said contaminate is limonene or xylene, or both limonene and xylene.

8. The method of claim 7, wherein said limonene is removed from said second phase by passing said second phase through said filter.

9. The method of claim 7, wherein said xylene is removed from said second phase by distillation.

10. The method of claim 6, wherein the extraction process is determined by monitoring the turbidity of the liquid.

11. The method of claim 6, wherein said apparatus further comprising two storage tanks, each operably connected to said reaction core via a tube wherein one storage tank is for storage of contaminated alcohol and the other storage tank is for storage of distilled water.

12. The method of claim 6, wherein said apparatus further comprising an emergency release storage tank operably connected to said reaction core via a tube.

13. The method of claim 6, wherein said apparatus, wherein the reaction core also contains halogen lamps.

* * * * *